United States Patent
Shibata et al.

(10) Patent No.: US 9,050,696 B2
(45) Date of Patent: Jun. 9, 2015

(54) OIL COMPOSITION, AND TRACE AMOUNT OIL SUPPLY TYPE CUTTING/GRINDING PROCESSING METHOD

(75) Inventors: Junichi Shibata, Tokyo (JP); Norio Sembongi, Tokyo (JP); Masanori Ibi, Tokyo (JP); Satoshi Suda, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 167 days.

(21) Appl. No.: 13/583,403

(22) PCT Filed: Dec. 10, 2010

(86) PCT No.: PCT/JP2010/072266
§ 371 (c)(1),
(2), (4) Date: Nov. 19, 2012

(87) PCT Pub. No.: WO2011/111277
PCT Pub. Date: Sep. 15, 2011

(65) Prior Publication Data
US 2013/0065804 A1 Mar. 14, 2013

(30) Foreign Application Priority Data
Mar. 11, 2010 (JP) ................. P2010-054579

(51) Int. Cl.
*C10M 145/38* (2006.01)
*C10M 145/26* (2006.01)
*C10M 145/32* (2006.01)
*B23Q 11/10* (2006.01)

(52) U.S. Cl.
CPC ........ *B23Q 11/1061* (2013.01); *B23Q 11/1046* (2013.01); *C10M 145/38* (2013.01); *C10M 2205/0285* (2013.01); *C10M 2207/021* (2013.01); *C10M 2207/026* (2013.01); *C10M 2207/126* (2013.01); *C10M 2207/2805* (2013.01); *C10M 2207/2835* (2013.01); *C10M 2207/401* (2013.01); *C10M 2209/103* (2013.01); *C10M 2209/104* (2013.01); *C10M 2219/024* (2013.01); *C10N 2220/022* (2013.01); *C10N 2230/02* (2013.01); *C10N 2230/06* (2013.01); *C10N 2240/401* (2013.01); *C10N 2240/406* (2013.01); *C10N 2240/409* (2013.01); *C10M 2207/282* (2013.01); *C10M 2209/106* (2013.01); *C10N 2240/407* (2013.01)

(58) Field of Classification Search
CPC .............. B12Q 1/10; C10M 2207/124; C10M 2207/128; C10M 145/38; C10M 2207/282; C10M 2209/106; C10M 2207/401; C10M 2209/104; C10M 2219/024; C10M 2207/2805; C10M 2205/0285; B23Q 11/1061; B23Q 11/1046; C10N 2240/407; C10N 2220/022
See application file for complete search history.

(56) References Cited

U.S. PATENT DOCUMENTS

| 6,068,670 | A | 5/2000 | Haupais et al. |
| 2010/0011923 | A1 | 1/2010 | Suda et al. |

FOREIGN PATENT DOCUMENTS

| EP | 2062684 | | 5/2009 |
| EP | 2062684 A1 | * | 5/2009 |
| JP | 6-100875 | | 4/1994 |
| JP | 06100875 A | * | 4/1994 |
| JP | 10-91713 | | 4/1998 |
| JP | 2001-192685 | | 7/2001 |
| JP | 2001-192686 | | 7/2001 |
| JP | 2001-192691 | | 7/2001 |
| JP | 2006-96826 | | 4/2006 |
| JP | 2008007544 A | * | 1/2008 |
| WO | 92/15747 | | 9/1992 |
| WO | 97/34969 | | 9/1997 |
| WO | 2008/108314 | | 9/2008 |

OTHER PUBLICATIONS

Search Report for EP Patent Application No. 10847504.7, mailed on Oct. 15, 2013.
Japan Office action for Application No. P2010-054579, mail date is Feb. 18, 2014.
International Search Report issued with respect to PCT/JP2010/072266, mailed Jan. 18, 2011.
English-langauge translation of International Preliminary Report on Patentability issued with respect to PCT/JP2010/072266, mailed Oct. 11, 2012.

* cited by examiner

*Primary Examiner* — Pamela H Weiss
(74) *Attorney, Agent, or Firm* — Greenblum & Bernstein, P.L.C.

(57) ABSTRACT

The present invention provides an oil composition comprising a lubricating base oil, and an alkylene oxide adduct of a hydroxy acid having a hydrophile-lipophile index of 8 to 15, wherein the oil composition is used for cutting/grinding processing by minimal quantity lubrication system. Further, the present invention provides a cutting/grinding processing method by minimal quantity lubrication system, comprising a step of supplying the oil composition of the present invention in the form of mist together with a compressed fluid to processing sites of a workpiece.

5 Claims, No Drawings

OIL COMPOSITION, AND TRACE AMOUNT OIL SUPPLY TYPE CUTTING/GRINDING PROCESSING METHOD

TECHNICAL FIELD

The present invention relates to an oil composition and a cutting/grinding processing method by minimal quantity lubrication system using the oil composition.

BACKGROUND ART

As one of cutting/grinding processing methods, there is a cutting/grinding processing method by minimal quantity lubrication system (also referred to as MQL, hereinbelow) in which a trace amount of oil ranging from a few mL per hour to a few tens of mL per hour is supplied together with compressed air to a metal to process the metal. Since MQL uses a less amount of oil than conventional metal processing methods, there is an advantage in reduction of the amount of wastes, and therefore, the range of applications of MQL is expanding as an environmentally friendly processing method.

In the case of MQL, even though only a trace amount of oil is supplied to processing sites, the influence of the oil is great. For instance, in the case where a water-soluble cutting fluid which has been used in conventional processing methods is used as is in MQL, the oil is ejected in the form of fine mist, and thus many of conventional water-soluble cutting fluids which contain an amine compound or the like may damage the respiratory system of operators.

Meanwhile, MQL is also required to have processability comparable to or higher than that of conventional processing methods. However, since there is a fundamental difference in working mechanism between MQL and conventional methods, if oil used in conventional processing methods is applied to MQL as is, the processability tends to be insufficient. For this reason, oils based on vegetable oil and synthetic ester suitable for MQL have been developed and widely used (for example, see Patent Literatures 1 to 4).

CITATION LIST

Patent Literature

Patent Literature 1: Japanese Patent Application Laid-Open Publication No. 2001-192685
Patent Literature 2: Japanese Patent Application Laid-Open Publication No. 2001-192686
Patent Literature 3: Japanese Patent Application Laid-Open Publication No. 10-091713
Patent Literature 4: Japanese Patent Application Laid-Open Publication No. 2001-192691

SUMMARY OF INVENTION

Technical Problem

However, depending on the material of a workpiece, there are many cases where sufficient processability cannot be obtained in MQL. Typical examples of such material are nonferrous metals typified by aluminum, and hard-to-cut materials for which importance is placed on cooling properties, such as titanium, stainless steel and INCONEL (an austenitic nickel-chromium-based superalloy). For instance, aluminum is used in a variety of industries with a view to weight reduction, and among these industries, the range of applications of aluminum is expanding especially in automobile industries. In addition, processing by use of environmentally friendly MQL has become more frequent, but sufficient processability may not be obtained with use of current oils.

The present invention has been accomplished in light of such reality, and an object of the present invention is to provide an oil composition for cutting/grinding processing by minimal quantity lubrication system, which has high processability and a high level of safety, and a cutting/grinding processing method by minimal quantity lubrication system using the oil composition.

Solution to Problem

In order to solve the aforementioned problems, the present invention provides an oil composition comprising a lubricating base oil, and an alkylene oxide adduct of a hydroxy acid having a hydrophile-lipophile index of 8 to 15, wherein the oil composition is used for cutting/grinding processing by minimal quantity lubrication system.

The hydrophile-lipophile index here means a mass ratio of hydrophilic group portions to lipophilic group portions in surfactant molecules, and is calculated by the following equation.

Hydrophile-Lipophile Index=(Molecular weight of hydrophilic group portions/Molecular weight of the whole surfactant)*100/5

The lipophilic group portions as referred to in the present invention mean hydrocarbon groups such as alkyl group and cycloalkyl group. Further, the hydrophilic group portions as referred to herein mean residues of surfactant molecules except lipophilic group portions.
For instance, in the case of the surfactant designated below, the portions enclosed by dotted lines in the following formulas are hydrophilic group portions.

[Chemical Formula 1]

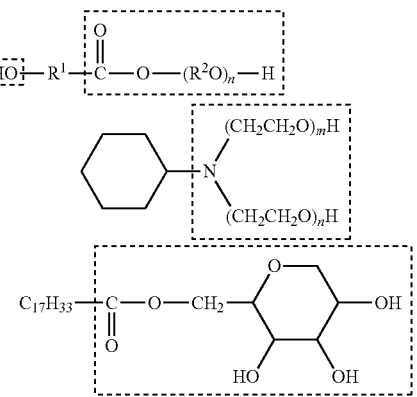

In the oil composition of the present invention, it is preferred that the lubricating base oil is a synthetic ester and/or a vegetable oil, and a content of the lubricating base oil is 5% by mass or more and 95% by mass or less, on the basis of the total amount of the composition.

Further, it is preferred that the oil composition of the present invention further comprises a monohydric alcohol having 8 to 24 carbon atoms.

Further, the present invention provides a cutting/grinding processing method by minimal quantity lubrication system, comprising a step of supplying the oil composition of the present invention in the form of mist together with a compressed fluid to processing sites of a workpiece.

It is preferred that the step further comprises supplying water in a mass of 0.01 times to 100 times the mass of the oil composition to the processing sites of the workpiece.

In the cutting/grinding processing method by minimal quantity lubrication system of the present invention, the material for a workpiece is not particularly limited. When the workpiece is a nonferrous metal, it is difficult to obtain sufficient processability with use of conventional MQL, however, the cutting/grinding processing method by minimal quantity lubrication system of the present invention makes it possible to obtain sufficient processability, even though the workpiece is a nonferrous metal. Further, even where the material of the workpiece is titanium, stainless steel or INCONEL (an austenitic nickel-chromium-based superalloy), the cutting/grinding processing method by minimal quantity lubrication system of the present invention is also suitable for such materials.

Advantageous Effect of Invention

When cutting/grinding processing by minimal quantity lubrication system is carried out, the oil composition and the cutting/grinding processing method by minimal quantity lubrication system of the present invention have an effect that it is possible to obtain good processability, causing less welding, while keeping cooling properties of workpiece without adversely affecting environments and human body.

DESCRIPTION OF EMBODIMENTS

Hereinafter, preferred embodiments of the present invention will be described.

As for the lubricating base oil contained in the oil composition of the present invention, mineral oil, synthetic oil, synthetic ester or vegetable oil can be used.

Specific examples of the mineral oil include paraffin-based or naphthene-based mineral oils which can be obtained by appropriately applying various kinds of purification means in combination to lubricating oil fractions that are obtained by subjecting a crude oil to atmospheric distillation and reduced-pressure distillation.

Further, as for the synthetic oil, for example, poly-α-olefin (polybutene, 1-octene oligomer, 1-decene oligomer, etc.), alkylbenzene, alkylnaphthalene, ester, polyoxyalkylene glycol, polyphenyl ether, etc. can be used.

Examples of the synthetic ester include aromatic ester, dibasic acid ester, polyol ester, complex ester, carbonate ester and mixtures thereof.

For the aromatic ester, esters of monovalent to hexavalent aromatic carboxylic acids, with aliphatic alcohols having 1 to 18 carbon atoms, etc. are used. Specific examples of the monovalent to hexavalent aromatic carboxylic acids include benzoic acid, phthalic acid, isophthalic acid, terephthalic acid, trimellitic acid, pyromellitic acid and mixtures thereof. The aliphatic alcohols having 1 to 18 carbon atoms may be linear or branched.

As for the dibasic acid ester, esters of dibasic acids having 5 to 10 carbon atoms such as glutaric acid, adipic acid, pimelic acid, suberic acid, azelaic acid and sebacic acid, with monohydric alcohols having 1 to 15 carbon atoms and having linear or branched alkyl groups, and mixtures thereof are preferably used. Specific examples thereof include di-tridecyl glutarate, di-2-ethylhexyl adipate, di-isodecyl adipate, di-tridecyl adipate, di-2-ethylhexyl sebacate and mixtures thereof.

As for the polyol ester, esters of diol having alkylene groups having 2 to 12 carbon groups or polyol having 3 to 20 hydroxyl groups, with fatty acids having 1 to 24 carbon atoms are preferably used.

Specific examples of the polyol include trimethylol ethane, trimethylol propane, trimethylol butane, di-(trimethylol propane), tri-(trimethylol propane), pentaerythritol, di-(pentaerythritol), tri-(pentaerythritol), glycerine, polyglycerine (2-20 glycerine units) 1,3,5-pentane triol, sorbitol, sorbitan, sorbitol-glycerine condensate, a polyhydric alcohol such as adonitol, arabitol, xylitol or mannitol, a sugar such as xylose, arabinose, ribose, rhamnose, glucose, fructose, galactose, mannose, sorbose, cellobiose, maltose, isomaltose, trehalose, sucrose, raffinose, gentianose or melezitose, and their partially etherified derivatives, and methyl glucosides (glycosides).

Among these, the polyol is preferably a hindered alcohol such as neopentyl glycol, trimethylolethane, trimethylolpropane, trimethylolbutane, di-(trimethylolpropane), tri-(trimethylol propane), pentaerythritol, and di-(pentaerythritol), because of their excellence in hydrolysis stability.

As for the fatty acid, fatty acids having 1 to 24 carbon atoms are usually used. Among these fatty acids having 1 to 24 carbon atoms, from the viewpoint of lubricity, those having 3 or more carbon atoms are preferred, those having 4 or more carbon atoms are more preferred, and those having 5 or more carbon atoms are still more preferred.

In addition, the fatty acid may be a linear fatty acid or a branched fatty acid. From the viewpoint of lubricity, a linear fatty acid is preferred. From the viewpoint of hydrolysis stability, a branched fatty acid is preferred. Furthermore, the fatty acid may be a saturated fatty acid or an unsaturated fatty acid.

Specific examples of the preferred polyol ester include a diester of neopentyl glycol, with one or two or more types of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane, with one or two or more types of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylol propane, with one or two or more types of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane, with one or two or more types of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol, with one or two or more types of fatty acids selected from valeric acid, isopentanoic acid, caproic acid, enanthic acid, caprylic acid, pelargonic acid, capric acid, 2-methylhexanoic acid, 2-ethylpentanoic acid, 2-ethylhexanoic acid, 3,5, 5-trimethylhexanoic acid, and oleic acid.

Here, the ester with two or more types of fatty acids may be a mixture of two or more polyol esters with one type each of fatty acid, or may be a polyol ester with a mixture of two or more types of fatty acids.

The polyol ester may be a partial ester in which all the hydroxyl groups of the polyol are not esterified and remain, a complete ester in which all the hydroxyl groups are esterified, or a mixture of a partial ester and a complete ester, however, it is preferably a complete ester.

The complex ester means an ester of fatty acid and dibasic acid, with monohydric alcohol and polyol, and as for the fatty acid, dibasic acid, monohydric alcohol and polyol, the same ones listed in the description on the dibasic ester and polyol ester can be used.

The carbonic acid ester means a compound having a carbonic acid ester structure in its molecule. The carbonic acid ester may have one carbonic acid ester structure or a plurality of carbonic acid structures in its one molecule.

As for alcohol composing the carbonic acid ester, the aforementioned aliphatic alcohols and polyols etc. can be used, and it is also possible to use polyglycol and an adduct in which polyglycol is added to polyol. In addition, a compound using a carbonic acid, a fatty acid and/or a dibasic acid may be used.

Further, it should be understood that the ester as referred to in the present invention may be a compound composed of one type of ester having a single structure or a mixture composed of two or more types of esters each having a different structure.

Among these synthetic esters, polyol esters are particularly preferred because of their excellence in biodegradability and stability.

The vegetable oil is not particularly limited, however, preferred examples thereof include vegetable oils such as palm oil, palm kernel oil, rapeseed oil, soybean oil, high-oleic rapeseed oil, and high-oleic sunflower oil.

When the oil composition of the present invention is composed of a synthetic ester and/or a vegetable oil as a base oil, it is preferred, from the viewpoint of stickiness, to use a synthetic ester and a vegetable oil, each having an iodine value ranging from 0 to 50 and a bromine value ranging from 0 $gBr_2$/100 g to 50 $gBr_2$/100 g. The iodine value of the ester means the value measured by the indicator titration method according to JIS K 0070, "Test methods for acid value, saponification value, ester value, iodine value, hydroxyl value, and unsaponifiable matter of chemical products". The bromine value of the ester means the value measured according to JIS K 2605, "Petroleum distillates and commercial aliphatic olefins—Determination of bromine number—Electrometric method".

To impart still better lubrication performance to the oil composition having low stickiness, it is preferred that the hydroxyl value of the ester be from 0.01 mg KOH/g to 300 mg KOH/g. The hydroxyl value is more preferably 200 mg KOH/g or lower, particularly preferably 150 mg KOH/g or lower, furthermore, more preferably 0.1 mg KOH/g or higher, still more preferably 0.5 mg KOH/g or higher, still yet more preferably 1 mg KOH/g or higher, particularly preferably 3 mg KOH/g or higher, and most preferably 5 mg KOH/g or higher. The hydroxyl value of the ester means the value measured by the indicator titration method according to JIS K 0070, "Test methods for acid value, saponification value, ester value, iodine value, hydroxyl value, and unsaponifiable matter of chemical products".

In addition, in order to impart still better lubrication performance to the oil composition having low stickiness, the saponification value of the ester is preferably from 100 mg KOH/g to 500 mg KOH/g. The saponification value is more preferably 400 mg KOH/g or lower, and more preferably, it is 200 mg KOH/g or higher. The saponification value of the ester means the value measured by the indicator titration method according to JIS K 2503, "Testing method of lubricating oil for aircraft".

The kinematic viscosity of the lubricating base oil contained in the oil composition of the present invention is not particularly limited, however, from the viewpoint of ease of supplying the oil composition to processing spots, the kinematic viscosity at 40° C. is preferably 200 mm$^2$/s or lower, more preferably 100 mm$^2$/s or lower, still more preferably 75 mm$^2$/s, and most preferably 50 mm$^2$/s or lower. Further, from the viewpoint of processability, the kinematic viscosity of the lubricating base oil is preferably 1 mm$^2$/s or higher, still more preferably 3 mm$^2$/s or higher, and most preferably 5 mm$^2$/s or higher.

The pour point and the viscosity index of the lubricating base oil contained in the oil composition of the present invention are not particularly limited, however, the pour point is preferably −20° C. or lower, and more preferably −45° C. or lower. The viscosity index is preferably 100 or higher and 200 or lower.

The content of the lubricating base oil contained in the oil composition of the present invention can be appropriately selected. When a synthetic ester and/or a vegetable oil is/are used as a lubricating base oil, the content of the lubricating base oil is 5% by mass or more from the viewpoint of processability and biodegradability, and it is preferably 10% by mass or more, more preferably 15% by mass or more, and still more preferably 20% by mass or more, on the basis of the total amount of the composition. Further, from the viewpoint of stability of the oil, it is preferably 95% by mass or less, and preferably 70% by mass or less.

Further, the oil composition of the invention of the present application contains an alkylene oxide adduct of a hydroxy acid having a hydrophile-lipophile index of 8 to 15. When the hydrophile-lipophile index is lower than 8 or higher than 15, the processability is insufficient. For the same reason, the hydrophile-lipophile index of the alkylene oxide adduct of a hydroxy acid is preferably 9 to 13.

The hydroxy acid composing the alkylene oxide adduct of a hydroxy acid is preferably an aliphatic monohydroxy acid, and specific examples thereof include Juniperic acid, ricinolic acid, Densipolic acid, α-oxylinolenic acid, Lesquerella acid, or monohydroxy acids contained in castor oil, rapeseed oil and tall oil.

Specific examples of alkylene groups of the alkylene oxide include ethylene group (—CH$_2$CH$_2$—), propylene group (—CH(CH$_3$)CH$_2$—), trimethylene group (—CH$_2$CH$_2$CH$_2$—), butylene group (—CH(CH$_2$CH$_3$)CH$_2$—) and tetramethylene group (—CH$_2$CH$_2$CH$_2$CH$_2$—). Among these alkylene groups, ethylene group and propylene group are more preferred.

As for the alkylene oxide adduct of a hydroxy acid, a compound represented by the following formula (1) is preferred.

[Chemical Formula 2]

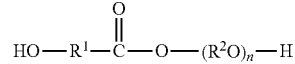

(1)

In the formula, R$^1$ represents a hydrocarbon group having 7 to 23 carbon atoms, preferably a hydrocarbon group having 9 to 21 carbon atoms, and more preferably a hydrocarbon group having 11 to 19 carbon atoms, which may be linear or branched and may be saturated or unsaturated. Further, the hydrocarbon group may be an aliphatic hydroxy acid or an aromatic hydroxy acid, however, an aliphatic monohydroxy acid which is unsaturated and has no branched chain is preferred. $R^2$ represents an alkylene group having 2 to 4 carbon atoms, n represents a repetition number of an oxyalkylene group represented by $R^2O$, and it is preferably an integer of 1 to 20, more preferably an integer of 2 to 15, and still more preferably an integer of 2 to 12. When $(R^2O)_n$ is a copolymer chain, the copolymer chain may be a random copolymer chain or a block copolymer chain, and is preferably a random polymer chain.

The content of the alkylene oxide adduct of a hydroxy acid in the oil composition of the present invention is not particularly limited, however, it is preferably 5% by mass to 80% by mass, more preferably, 10% by mass to 70% by mass, and still more preferably 20% by mass to 60% by mass, on the basis of the total amount of the composition.

The oil composition of the present invention may be a composition composed only of the lubricating base oil and the alkylene oxide adduct of a hydroxy acid, however, it is preferred that the oil composition further contains a monohydric alcohol having 8 to 24 carbon atoms. If the number of carbon atoms of the alcohol is more than 24, the stability of the oil tends to lower. If the number of carbon atoms of the alcohol is less than 8, it may cause a problem with odor.

Specific examples of the monohydric alcohol having 8 to 24 carbon atoms include monohydric alkyl alcohols such as octanol, nonanol, decanol, undecanol, dodecanol, tridecanol, tetradecanol, pentadecanol, hexadecanol, heptadecanol, octadecanol, nonadecanol, eicosanol, heneicosanol, tricosanol and tetracosanol; monohydric alkenyl alcohols such as octenol, nonenol, decenol, undecenol, dodecenol, tridecenol, tetradecenol, pentadecenol, hexadecenol, heptadecenol, octadecenol, nonadecenol, eicocenol, heneicocenol, tricocenol and tetracocenol; and mixtures of two or more types thereof. Each of these alcohols may be liner or branched and may be saturated or unsaturated. The monohydric alcohol is preferably a monohydric alkyl alcohol and/or a monohydric alkenyl alcohol each having 9 to 24 carbon atoms, more preferably a monohydric alkyl alcohol and/or a monohydric alkenyl alcohol each having 10 to 22 carbon atoms, and particularly preferably a monohydric alkyl alcohol and/or a monohydric alkenyl alcohol each having 12 to 20 carbon atoms.

The blending amount of the monohydric alcohol having 8 to 24 carbon atoms is not particularly limited, however, it is preferably 1% by mass to 60% by mass, more preferably 3% by mass to 50% by mass, and still more preferably 5% by mass to 40% by mass, on the basis of the total amount of the composition.

Furthermore, the oil composition of the present invention can further contain additives which are conventionally known as cutting/grinding oils. Examples of the additives include surfactants such as alkylphenol-ethylene oxide adduct, higher alcohol ethylene oxide adduct, polyoxyethylene fatty acid ester, polypropylene glycol ethylene oxide adduct, fatty acid ester of sorbitol and sorbitan, and diethylene glycol monoalkyl ether; antioxidants such as 2,6-di-tert-butyl-p-cresol, 4,4'-methylenebis(2,6-di-tert-butylphenol), 4,4'-bis(2,6-di-tert-butylphenol), and 4,4'-thiobis(6-tert-butyl-o-cresol); oiliness agents such as fatty acid, alcohol, and fatty acid ester; corrosion inhibitors such as carboxylic acid, carboxylate, sulfonate such as a calcium sulfonate, phosphoric acid, and phosphate; antifoaming agents such as methyl silicone, fluoro-silicone, and polyacrylate; and extreme-pressure agents such as sulfur-based ones such as sulfurized oil, sulfurized ester and polysulfide, and phosphorus-based ones such as phosphate ester. It is preferred to use an oiliness agent among these additives, such as fatty acid, alcohol or fatty acid ester, because the processability of the oil composition of the present invention can be further improved. When a hard-to-cut material, particularly, titanium, stainless steel and INCONEL (an austenitic nickel-chromium-based superalloy) is to be processed, it is preferred to use sulfur-based and phosphorus-based extreme-pressure agents in combination.

In the case where the additives are used, each content thereof is not particularly limited, however, the total content of the additives is preferably 0.1% by mass to 10% by mass on the basis of the total amount of the composition.

The kinematic viscosity of the oil composition of the present invention is not particularly limited, however, from the viewpoint of ease of supplying the oil composition to processing spots, the kinematic viscosity at 40° C. is preferably 80 mm$^2$/s or lower, more preferably 70 mm$^2$/s or lower, still more preferably 60 mm$^2$/s or lower, and most preferably 55 mm$^2$/s or lower. Meanwhile, from the viewpoint of processability, the kinematic viscosity of the oil composition of the present invention at 40° C. is preferably 5 mm$^2$/s or higher, more preferably 10 mm$^2$/s or higher, and most preferably 15 mm$^2$/s or higher.

The oil composition of the present invention can be preferably used as oil in cutting/grinding processing methods by minimal quantity lubrication system (MQL). That is, the cutting/grinding processing method by minimal quantity lubrication system of the present invention comprises a step of supplying an oil composition in the form of mist together with a compressed fluid to processing sites of a workpiece.

In MQL, oil in an amount of a few mL per hour to a few tens of mL per hour (preferably, 1 mL/h to 90 mL/h) is supplied in the form of mist together with a compressed fluid to processing sites (cutting/grinding processing sites) of a workpiece. As for the compressed fluid, besides compressed air, compressed fluids such as nitrogen, argon, helium and carbon dioxide can be used alone, or these fluids can be used in the form of a mixture.

Furthermore, when the oil composition of the present invention is applied to MQL, it is preferred that water in a mass of 0.01 times to 100 times the mass of the oil composition be supplied to processing sites of a workpiece. The amount of water to be used is more preferably 0.01 times to 100 times the mass of the oil composition, still more preferably 2 times to 100 times the mass of the oil composition, still yet more preferably 3 times to 50 times the mass of the oil composition, particularly preferably 4 times to 40 times the mass of the oil composition, and most preferably 5 times to 30 times the mass of the oil composition.

The method of supplying water is not particularly limited. Examples thereof include (i) a method in which a mixture of an oil composition and water is formed into mist by a compressed fluid, and then the mixture is supplied to processing sites, (ii) a method in which an oil composition and water are individually formed into mist, and each of them is separately supplied to processing sites, and (iii) a method in which an oil composition and water are individually formed into mist and mixed, and then the mixture is supplied to processing sites.

The material of a workpiece to be processed by the oil composition and the cutting/grinding processing method by minimal quantity lubrication system of the present invention is not particularly limited, however, the oil composition and the method of the present invention are suitable for nonferrous metal, especially, aluminum and aluminum alloys, and hard-to-cut materials, especially, titanium, stainless steel and INCONEL (an austenitic nickel-chromium-based superalloy).

EXAMPLES

Hereinafter, the present invention will be further described in detail with reference to Examples and Comparative Examples, however, the present invention is not limited at all to the following Examples.

Examples 1 to 9 and Comparative Examples 1 to 6

Using the following lubricating base oils and additives, oil compositions each having the composition designated in Tables 1 to 3 were prepared.

(A) Base Oil

A1: full ester of trimethylol propane, a caprylic acid and a capric acid
A2: full ester of neopentyl glycol and a caprylic acid
A3: full ester of pentaerythritol and a decyl alcohol capric acid
A4: high-oleic rapeseed oil
A5: poly-α-olefin (which is the one that the kinematic viscosity at 40° C. was adjusted to 20 mm$^2$/s)

(B) Alkylene Oxide Adduct of a Hydroxy Acid

B1: monoester (hydrophile-lipophile index: 13.6) of a castor oil fatty acid (ricinolic acid content: 90.5%, linoleic acid content: 3.75%, oleic acid content: 3.0%, palmitic acid content: 0.75%, stearic acid content: 0.75%, dihydroxy acid content: 0.75%, linolenic acid content: 0.5%) and polyethylene glycol (10 mol)
B2: monoester (hydrophile-lipophile index: 7.75) of a ricinolic acid and polyethylene glycol (2 mol)
B3: monoester (hydrophile-lipophile index: 6.18) of a ricinolic acid and polyethylene glycol (1 mol)
B4: monoester (hydrophile-lipophile index: 16.0) of a ricinolic acid and polyethylene glycol (20 mol)
B5: monoester (hydrophile-lipophile index: 14.1) of an oleic acid and polyethylene glycol (12 mol)

(C) Alcohol

C1: oleyl alcohol
C2: lauryl alcohol
C3: hexacosanol

Other Additives

D1: oleic acid
D2: 2,6-di-tert-butyl-p-cresol
D3: sulfurized ester

Next, using the oil compositions of Examples 1 to 14 and Comparative Examples 1 to 8, the tests described below were performed.

<Measurement of kinematic viscosity at 40° C.>

The kinematic viscosity at 40° C. of each of the oil compositions was measured according to JIS K 2283. The obtained results are shown in Tables 1 to 3.

<Processability test; Tapping test>

The processing performance of the oil compositions was evaluated using adipic acid diisodecyl as a comparison standard oil. Specifically, the test oils (each oil composition) and adipic acid diisodecyl were alternately used to perform a tapping test under the following conditions.

When supplying the oil to processing sites, the oil was directly sprayed to the processing sites under the condition of 8.5 mL/min.
Grinding workpiece material 1: aluminum alloy (AC8A) specified in JIS H 5202
Grinding workpiece material 2: stainless steel plate (SUS304) specified in JIS G 4305
Tap diameter: 8 mm
Tap pitch: 1.25 mm
Tap rake angle: 1.5 degrees
Tap lead angle: 10 degrees
Tap prepared hole diameter: 7.4 mm
Number of revolution: 360 rpm
Standard oil: DIDA (adipic acid diisodecyl)

In Tables 1 to 3, A to D in column "Oil supplying method" mean that the oil composition was supplied to processing sites by each of the following methods A to D.
A: Directly form oil into mist, and supply it to processing sites.
B: Dilute oil with tap water to 20 times its initial volume, and supply it to processing sites.
C: Mix oil formed into mist and tap water formed into mist at a mixing ratio of 1 (oil agent):10 (water) to produce a mixture, and supply the mixture to processing sites.
D: Dilute oil with tap water to 120 times its initial volume, and supply it to processing sites.

The tapping energy was measured in the test, and the tapping energy efficiency (TEEE, %) was calculated using the following equation.

Tapping Energy Efficiency(%)=(Tapping energy when using comparison standard oil)/(Tapping energy when using metal-processing oil composition)

The obtained results are shown in Tables 1 to 3. This means that the higher the value of tapping energy efficiency, the higher the lubricity is.

<Stability test of oil agent>

As for the stability of the oil compositions, each of the oil compositions was diluted with tap water to 10 times its initial volume and left standing at room temperature to examine separation behavior of the oil. Oil with no separation observed after 24 hours of the dilution was rated as A; and oil with even a small amount of floating separated oil observed was rated as B. The obtained results are shown in Tables 1 to 3.

TABLE 1

|  |  | Example 1 | Example 2 | Example 3 | Example 4 | Example 5 | Example 6 | Example 7 |
|---|---|---|---|---|---|---|---|---|
| Composition (% by mass) | Base oil A1 | 50 | 40 | — | — | — | — | 40 |
|  | Base oil A2 | — | — | 40 | — | — | — | — |
|  | Base oil A3 | — | — | — | 40 | — | — | — |
|  | Base oil A4 | — | — | — | — | 40 | — | — |
|  | Base oil A5 | — | — | — | — | — | 40 | — |
|  | B1 | 50 | 40 | — | 40 | 40 | 40 | 40 |
|  | B2 | — | — | 40 | — | — | — | — |
|  | B3 | — | — | — | — | — | — | — |

TABLE 1-continued

|  |  | Example 1 | Example 2 | Example 3 | Example 4 | Example 5 | Example 6 | Example 7 |
|---|---|---|---|---|---|---|---|---|
|  | B4 | — | — | — | — | — | — | — |
|  | B5 | — | — | — | — | — | — | — |
|  | C1 | — | 20 | 20 | — | — | — | 15 |
|  | C2 | — | — | — | 20 | 20 | 20 | — |
|  | C3 | — | — | — | — | — | — | — |
|  | D1 | — | — | — | — | — | — | 2 |
|  | D2 | — | — | — | — | — | — | 1 |
|  | D3 | — | — | — | — | — | — | 2 |
| Work material |  | 1 | 1 | 1 | 1 | 1 | 1 | 1 |
| Kinematic viscosity at 40° C. (mm$^2$/s) |  | 39.85 | 33.40 | 32.55 | 42.43 | 44.99 | 35.32 | 37.95 |
| Oil supply method |  | A | A | A | A | A | A | A |
| TEE (%) |  | 135 | 142 | 149 | 140 | 138 | 131 | 149 |
| Stability |  | A | A | A | A | A | A | A |

TABLE 2

|  |  | Example 8 | Example 9 | Example 10 | Example 11 | Example 12 | Example 13 | Example 14 | Example 15 |
|---|---|---|---|---|---|---|---|---|---|
| Composition (% by mass) | Base oil A1 | 70 | 15 | 40 | 40 | 7 | 87 | 80 | 80 |
|  | Base oil A2 | — | — | — | — | — | — | — | — |
|  | Base oil A3 | — | — | — | — | — | — | — | — |
|  | Base oil A4 | — | — | — | — | — | — | — | — |
|  | Base oil A5 | — | — | — | — | — | — | — | — |
|  | B1 | 20 | 57 | 40 | 40 | 62 | 9 | — | — |
|  | B2 | — | — | — | — | — | — | — | — |
|  | B3 | — | — | — | — | — | — | — | — |
|  | B4 | — | — | — | — | — | — | — | — |
|  | B5 | — | — | — | — | — | — | — | — |
|  | C1 | 10 | 28 | 20 | 20 | 31 | 4 | 20 | 20 |
|  | C2 | — | — | — | — | — | — | — | — |
|  | C3 | — | — | — | — | — | — | — | — |
|  | D1 | — | — | — | — | — | — | — | — |
|  | D2 | — | — | — | — | — | — | — | — |
|  | D3 | — | — | — | — | — | — | — | — |
| Work material |  | 1 | 1 | 1 | 1 | 1 | 1 | 1 | 2 |
| Kinematic viscosity at 40° C. (mm$^2$/s) |  | 31.68 | 23.46 | 33.42 | 33.42 | 44.82 | 22.67 | 26.45 | 26.45 |
| Oil supply method |  | A | A | B | C | C | C | A | A |
| TEE (%) |  | 137 | 134 | 167 | 157 | 139 | 133 | 130 | 126 |
| Stability |  | A | A | A | A | A | A | A | A |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Composition (% by mass) | Base oil A1 | 50 | 40 | 40 | 40 | 100 | — | 80 | 40 | 40 |
|  | Base oil A2 | — | — | — | — | — | — | — | — | — |
|  | Base oil A3 | — | — | — | — | — | — | — | — | — |
|  | B1 | — | — | — | — | — | 100 | — | 40 | — |
|  | B2 | — | — | — | — | — | — | — | — | — |
|  | B3 | 50 | 40 | — | — | — | — | — | — | — |
|  | B4 | — | — | 40 | — | — | — | — | — | — |
|  | B5 | — | — | — | 40 | — | — | — | — | 40 |
|  | C1 | — | 20 | 20 | 20 | — | — | 20 | 20 | 20 |
|  | C2 | — | — | — | — | — | — | — | — | — |
|  | D1 | — | — | — | — | — | — | — | — | — |
|  | D2 | — | — | — | — | — | — | — | — | — |
|  | D3 | — | — | — | — | — | — | — | — | — |
| Work material |  | 1 | 1 | 1 | 1 | 1 | 1 | 1 | 1 | 2 |
| Kinematic viscosity at 40° C. (mm$^2$/s) |  | 29.80 | 26.54 | 48.83 | 45.99 | 20.76 | 88.57 | 19.92 | 33.40 | 45.99 |
| Oil supply method |  | A | A | A | A | A | A | A | D | A |
| TEE (%) |  | 124 | 131 | 121 | 111 | 97 | 115 | 94 | 77 | 94 |
| Stability |  | B | B | A | A | A | A | A | A | A |

The invention claimed is:

1. A cutting/grinding processing method by minimal quantity lubrication system, comprising:

supplying an oil composition in the form of mist together with a compressed fluid to processing sites of a workpiece, wherein the oil composition comprises a lubricating base oil and an alkylene oxide adduct of a hydroxy acid according to formula (1) having a hydrophile-lipophile index of 7.75 to 15

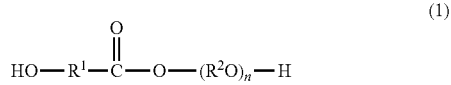

(1)

wherein $R^1$ represents a hydrocarbon group having 7 to 23 carbon atoms, $R^2$ represents an alkylene group having 2 to 4 carbon atoms, and n represents an integer of 1 to 20.

2. The cutting/grinding processing method by minimal quantity lubrication system according to claim 1, which further comprises supplying water in a mass of 0.01 times to 100 times the mass of the oil composition to the processing sites of the workpiece.

3. The cutting/grinding processing method by minimal quantity lubrication system according to claim 1, wherein the workpiece is a nonferrous metal.

4. The cutting/grinding processing method by minimal quantity lubrication system according to claim 1, wherein a material of the workpiece is titanium, stainless steel or an austenitic nickel-chromium based superalloy.

5. The cutting/grinding processing method by minimal quantity lubrication system according to claim 2, wherein the water is supplied by at least one of the following:

mixing it with the oil composition to form a mixture, forming the mixture into a mist using a compressed fluid, and supplying the mist to the processing site;

forming a mist of the water and supplying the mist separate from the oil composition; or individually forming a mist of the water and a mist of the oil composition, mixing the mists of the water and the oil composition, and supplying the mixture of mists to the processing site.

* * * * *